(12) United States Patent
Nagatsuka et al.

(10) Patent No.: US 7,904,207 B2
(45) Date of Patent: Mar. 8, 2011

(54) METHOD OF EVALUATING AND CORRECTING ROBOT PROGRAM AND DEVICE FOR EVALUATING AND CORRECTING ROBOT PROGRAM

(75) Inventors: Yoshiharu Nagatsuka, Yamanashi (JP); Toshiya Takeda, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 1261 days.

(21) Appl. No.: 11/459,628

(22) Filed: Jul. 24, 2006

(65) Prior Publication Data

US 2007/0021868 A1 Jan. 25, 2007

(30) Foreign Application Priority Data

Jul. 25, 2005 (JP) ................................. 2005-214890
Jul. 14, 2006 (JP) ................................. 2006-194764

(51) Int. Cl.
    *G05B 19/18* (2006.01)
(52) U.S. Cl. .......... 700/250; 700/245; 901/3; 318/568.1; 318/568.13
(58) Field of Classification Search .................. 700/245, 700/250, 256, 260, 261; 318/568.1, 568.13, 318/568.22, 568.23; 901/3, 20
See application file for complete search history.

(56) References Cited

U.S. PATENT DOCUMENTS

| | | | |
|---|---|---|---|
| 4,705,999 A | 11/1987 | Soji | |
| 4,817,017 A | 3/1989 | Kato | |
| 6,127,792 A | 10/2000 | Kamiya | |
| 6,332,101 B1 * | 12/2001 | Kaneko et al. | 700/245 |
| 6,363,300 B1 * | 3/2002 | Inga | 700/245 |

FOREIGN PATENT DOCUMENTS

| | | |
|---|---|---|
| JP | 07266267 A | 10/1995 |
| JP | 2003191186 A | 7/2003 |
| JP | 2005-022062 A | 1/2005 |
| JP | 2005-066797 A | 3/2005 |
| WO | 97/29890 A1 | 8/1997 |
| WO | WO 97/29890 * | 8/1997 |
| WO | 02/074501 A1 | 9/2002 |

OTHER PUBLICATIONS

Partial European Search Report issued in corresponding Japanese application on Nov. 28, 2006.
Extended European Search Report mailed Apr. 5, 2007 for Application No. 06015387.1-1239. All other references were made of record in IDS filed Jan. 31, 2007.

\* cited by examiner

*Primary Examiner* — Thomas G Black
*Assistant Examiner* — Peter D Nolan
(74) *Attorney, Agent, or Firm* — Lowe, Hauptman, Ham & Berner, LLP (57) ABSTRACT

There is provided a device for evaluating and correcting a robot operation program for evaluating an appropriateness for the robot operation program and correcting the robot operation program, comprising a computer including a simulation function for confirming a robot operation. The computer includes a load calculation section for calculating a load given to a motor for driving an operating portion of the robot by a simulation conducted by a computer; and an evaluation section for evaluating, by an evaluation function, whether or not the load exceeds a predetermined allowed value.

2 Claims, 7 Drawing Sheets

METHOD OF EVALUATING AND CORRECTING ROBOT PROGRAM AND DEVICE FOR EVALUATING AND CORRECTING ROBOT PROGRAM

RELATED APPLICATIONS

The present application is based on, and claims priority from, Japanese Application Numbers 2005-214890, filed Jul. 25, 2005 and 2006-194764, filed Jul. 14, 2006, the disclosures of which are hereby incorporated by reference herein in their entirety.

BACKGROUND OF THE INVENTION

1. Field of the Invention

The present invention relates to a method, of evaluating and correcting a robot program, for correcting an operation program of a robot so that the robot can perform a desired operation. The present invention also relates to a device for evaluating and correcting a robot program.

2. Description of the Related Art

In general, an operation program of a robot made off-line is seldom used at a work-site as it is but is only used after it has been corrected. The reason is that a relative positional relation between a workpiece and the robot is slightly different and, further, a posture of the robot is slightly different between the off-line state and the on-line state. In order to correct the operation program, a deviation of an operation route is corrected and, further, a speed command and an acceleration command to be given to a servo motor are corrected, in some cases.

In the case of correcting the speed command and the acceleration command of the operation program, a load given to the servo motor is checked. While a duty ratio is being checked with a teaching panel at a work-site, the speed command and the acceleration command are corrected. In this case, the duty ratio is a ratio of on-state to one operation cycle with respect to an electric current.

A deviation of the operation route is defined as a deviation between a target operation route and an actual operation route of a robot. In the case of correcting this deviation, with respect to a teaching point actually obtained when a target position of the workpiece is touched by the robot, a teaching point defined on an image plane is shifted so that the teaching point defined on the image plane can gradually approach the teaching point actually obtained when the target position of the workpiece is touched by the robot. In this way, the deviation is corrected so that the teaching point can be on the target operation route. An example of another method is described as follows. When a unit difference matrix, which is obtained from a difference between the teaching point of the target position and the teaching point actually touched, is multiplied by the target position from the its right side, the teaching point is shifted so that the teaching point can be corrected.

Examples of a well known device for evaluating and correcting a robot program are disclosed in the official gazettes of JP-A-2005-66797 and JP-A-2005-22062. Concerning the software to operate this type correcting device, "Roboguide" (registered trademark), which was proposed by the present applicant, is on the market.

However, the work which is conducted for correcting a speed command and an acceleration command to be given to the servo motor of the robot, while the duty ratio is being confirmed at the work-site, is accompanied by trial and error in many cases. Therefore, a large amount of labor is needed to conduct this work.

It is necessary to prudently conduct the work of correcting a deviation of the operation route at the work-site. Teaching points specified on the operation route, the deviations of which are large, must be touched and gradually shifted and corrected for each teaching point. Therefore, it can take a very long time to construct a manufacturing system in which the robot is used.

SUMMARY OF THE INVENTION

An object of the present invention is to provide a method of evaluating and correcting a robot operation program made off-line easily and in a short period of time. Another object of the present invention is to provide a device capable of evaluating and correcting a robot operation program made off-line easily in a short period of time.

In order to accomplish the above object, the present invention provides a method of evaluating and correcting a robot operation program for evaluating an appropriateness for the robot operation program and correcting the robot operation program, comprising: calculating a load, which is given to a motor for driving an operating portion of the robot by a simulation conducted by a computer; and evaluating whether or not the load exceeds a predetermined allowed value by an evaluation function.

According to this invention, it is possible to evaluate a load given to the servo motor off-line. According to this evaluation, it is possible to evaluate whether or not the operation program is good. Therefore, compared with a case in which the load is compared at a work-site, the operation program can be corrected in a short period of time. Accordingly, the robot can be set up in a short period of time at the work-site.

Further, the present invention provides a method, of evaluating and correcting a robot operation program, comprising: storing a speed command and an acceleration command given to the motor, and the load calculated by the simulation, as one set of time base data; and correcting the speed command and the acceleration command for each simulation executed repeatedly so that a task-cycle time of the robot can be minimized in a range lower than the predetermined allowed value of the load by repeatedly executing the simulation.

The method of the invention includes: a first step in which the load is calculated for each simulation; a second step in which the speed command, the acceleration command and the load are arranged as one set of time base data and stored; a third step in which the load is evaluated; and a fourth step in which the speed command and the acceleration command are corrected in a predetermined allowed range of the load. Due to the foregoing, the evaluation and the correction of the operation program can be conducted in relation to each other. Due to the foregoing, the time for setting the robot at a work-site can be further reduced.

The present invention provides a method of evaluating and correcting a robot operation program for evaluating an appropriateness for the robot operation program and correcting the robot operation program, comprising: storing a deviation between an arbitrary target teaching point on a target operation route of the robot, and a pseudo teaching point on a pseudo operation route defined by a simulation conducted by computer and corresponding to the target teaching point; and correcting the pseudo teaching point by executing the simulation until a deviation is decreased to a value lower than a predetermined allowed value by shifting the pseudo teaching point by a predetermined changing distance so as to reduce the deviation when it is evaluated by an evaluation function whether or not the deviation exceeds the predetermined allowed value and the deviation exceeds the predetermined allowed value.

According to this invention, a deviation between the target teaching point and the pseudo teaching point is stored in the first step, and the simulation is repeatedly executed so as to correct a teaching point until the deviation is reduced to a value lower than the predetermined allowed value in the second step. Therefore, compared with a case in which a large number of teaching points are corrected at a work-site so as to make the target operation route agree with the pseudo operation passage, the teaching point of the program can be corrected in a short period of time. Due to the foregoing, the set-up time of the robot at the work-site can be greatly reduced.

The present invention provides a device for evaluating and correcting a robot operation program for evaluating an appropriateness for the robot operation program and correcting the robot operation program, comprising a computer including a simulation function for confirming a robot operation, the computer comprising: a load calculation section for calculating a load given to a motor for driving an operating portion of the robot by a simulation conducted by a computer; and an evaluation section for evaluating, by an evaluation function, whether or not the load exceeds a predetermined allowed value.

According to this invention, it is possible to evaluate a load given to the servo motor off-line. According to this evaluation, it is possible to evaluate whether or not the operation program is good. Therefore, compared with a case in which the load is evaluated at a work-site, the operation program can be corrected in a short period of time. Accordingly, the robot can be set up in a short period of time, at the work-site.

Further, the present invention provides a device for evaluating and correcting a robot program, the computer comprising: a storage section for storing a speed command and an acceleration command given to the motor, and the load calculated by the simulation, as one set of time base data; and a correction section for correcting the speed command and the acceleration command for each simulation executed repeatedly, whereby a task-cycle time of the robot can be minimized in a range lower than the predetermined allowed value of the load by repeatedly executing the simulation.

According to the present invention, the load is calculated, by the load calculation section, for each simulation. The speed command, the acceleration command and the load are stored by the storage section as one set of time data set. The load given to the motor is evaluated by the evaluation section and the speed command and the acceleration command are corrected in a range lower than the predetermined allowed range of the motor. Therefore, compared with a case in which the operation program is corrected at the work-site so that the task-cycle time can be minimized, the operation program can be corrected in a short period of time. Due to the foregoing, the set-up time of the robot at the work-site can be greatly reduced.

The present invention provides a device for evaluating and correcting a robot operation program for evaluating an appropriateness for the robot operation program and correcting the robot operation program, comprising a computer including a simulation function for confirming a robot operation, the computer comprising: a storage section for storing a deviation between an arbitrary target teaching point on a target operation route of the robot, and a pseudo teaching point on a pseudo operation route defined by a simulation conducted by the computer and corresponding to the target teaching point; and a correction section for correcting the pseudo teaching point by executing the simulation until a deviation is decreased to a value lower than a predetermined allowed value by shifting the pseudo teaching point by a predetermined changing distance so as to reduce the deviation when it is evaluated by an evaluation function whether or not the deviation exceeds the predetermined allowed value and the deviation exceeds the predetermined allowed value.

According to the present invention, a deviation between the target teaching point and the pseudo teaching point is stored by the storage section, and the teaching point is corrected by the correcting section when the simulation is repeatedly executed until the deviation is reduced to a value lower than the predetermined allowed value. Therefore, compared with a case in which a large number of teaching points are corrected at a work-site so that the target operation route and the pseudo operation route can be made to agree with each other, it is possible to correct the teaching point of the operation program in a short period of time. Due to the foregoing, the set-up time of the robot at the work-site can be greatly reduced.

BRIEF DESCRIPTION OF THE DRAWINGS

The above and other object, features and advantages of the present invention will appear more fully from the following description of the preferred embodiment related to the accompanying drawings. In the drawings.

DETAILED DESCRIPTION

Figure 1:
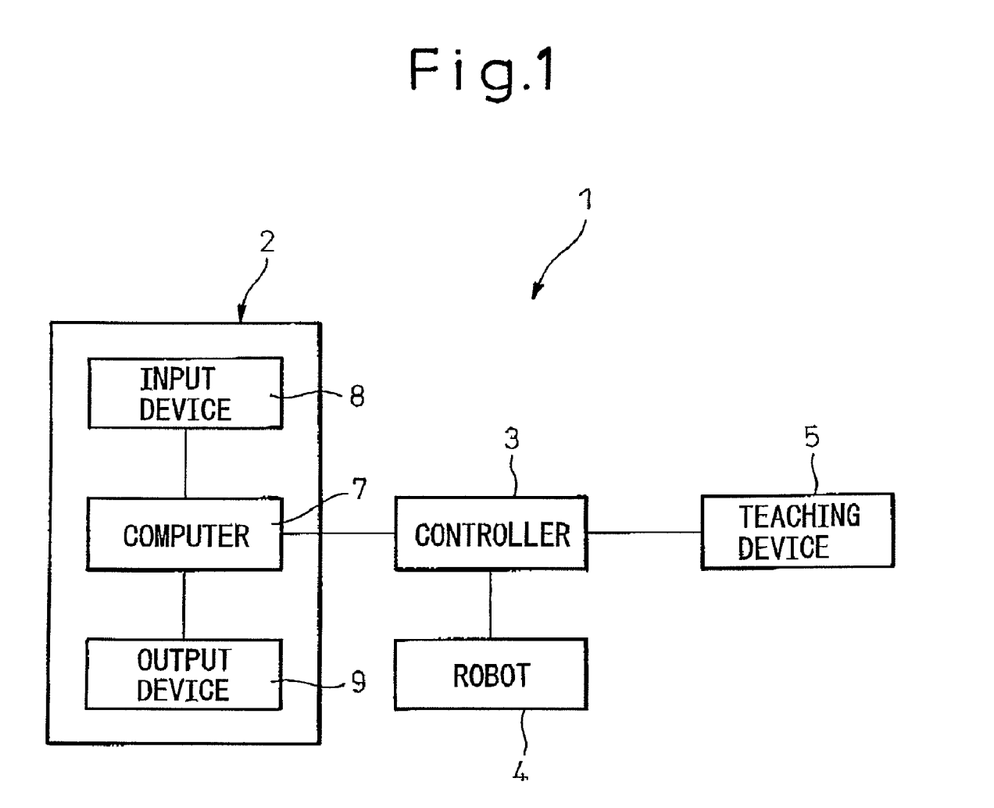
FIG. 1 is a system block diagram showing a robot operation program evaluating and correcting device system including a robot operation program evaluating and correcting device of the present invention.

A specific embodiment of the present invention will be explained in detail referring to the drawings. FIG. 1 is a system block diagram showing a robot operation program evaluating and correcting device system including a robot operation program evaluating and correcting device of the present invention.

In FIG. 1, reference numeral 7 is a computer included in the robot operation program evaluating and correcting device 2, reference numeral 8 is an input device such as a keyboard and a mouse connected to the computer, and reference numeral 9 is an output device connected to the computer. Reference numeral 3 is a controller for controlling on operation of the robot by a robot operation program, reference numeral 4 is a robot for industrial use, which is an object to be controlled, and reference numeral 5 is a teaching device used for teaching the teaching points of the robot. In this connection, various robots having a plurality of operation axes can be used as the robot 4.

The robot operation program evaluating and correcting device 2 of the present invention includes at least the computer 7, the input device 8 and the output device 9. The robot operation program evaluating and correcting device 2 of the present invention is capable of correcting an operation program off-line. In this connection, the robot operation program evaluating and correcting system 1 includes the robot operation program evaluating and correcting device 2, the controller 3, the robot 4 and the teaching device 5.

The output device 9 of the robot operation program evaluating and correcting device 2 is a display which is a displaying device. This output device 9 displays image data of the robot 4, a workpiece (not shown) which is an object to be worked on and a peripheral device (not shown). The computer 7 can execute a simulation of the robot 4 together according to the operation program on the output device 9. The simulation is conducted for evaluating and correcting the robot operation program. In the simulation, a pseudo operation is conducted by the robot according to a designated movement command.

Figure 2:
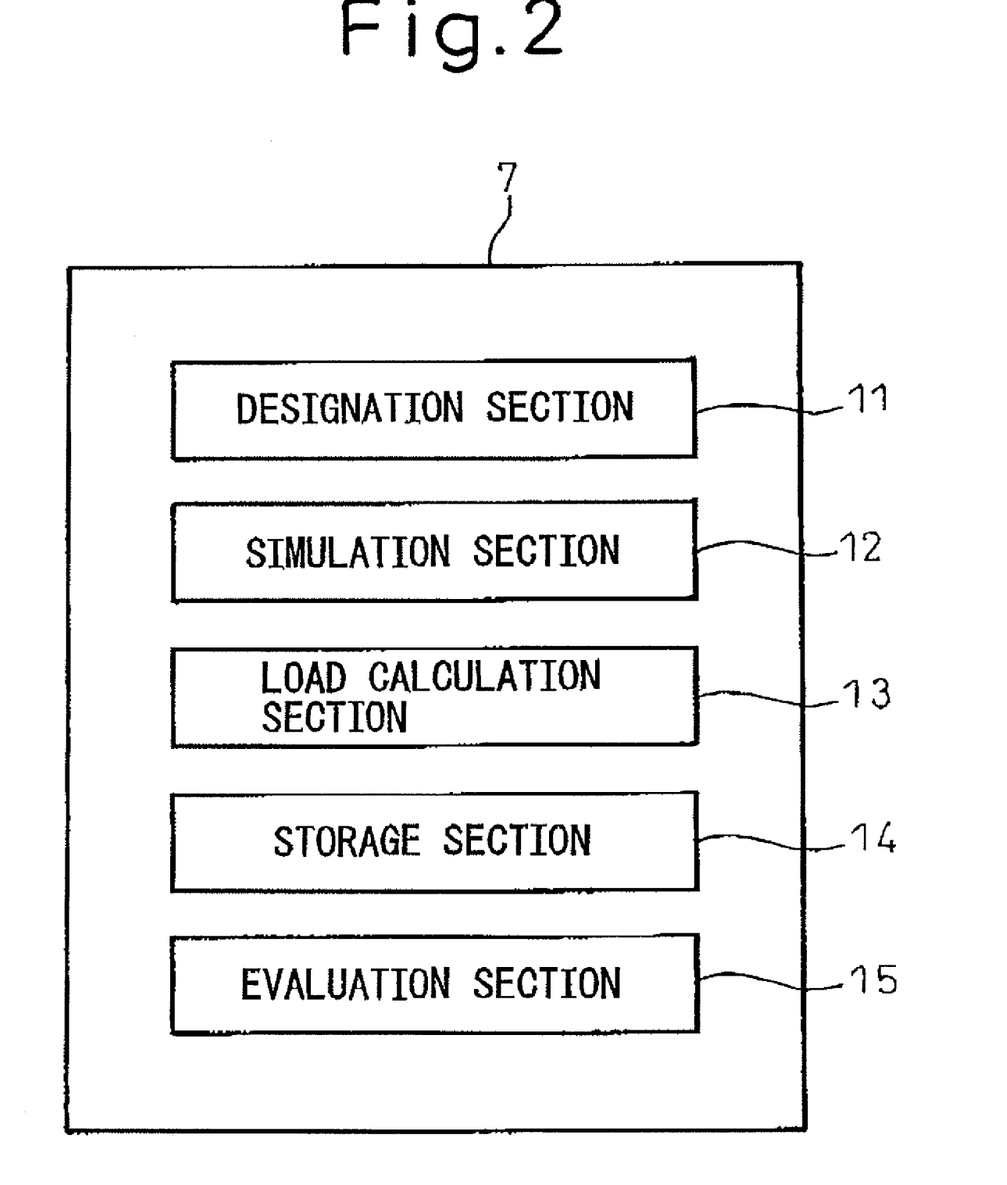
FIG. 2 is a block diagram showing the first embodiment of the robot operation program evaluating and correcting device.

FIG. 2 is a block diagram showing the first embodiment of the robot operation program evaluating and correcting device. The robot operation program evaluating and correcting device 2 of this embodiment is a device for correcting a speed command and an acceleration command so that a cycle time of the robot 4 can be minimized in an allowed range of the load. For example, the robot operation program evaluating and correcting device 2 of this embodiment includes: a designation section 11 for designating an allowed value of a load of the servo motor to drive an operating portion such as an upper arm or a front arm of a 6-axis multiple joint type robot; a simulation section 12 for conducting a simulation of the operation program; a load calculation section 13 for calculating a load given to the servo motor; a storage section 14 for storing a speed command, an acceleration command and a load with respect to the servo motor in relation to the time series; and an evaluation section 15 for evaluating whether or not a load given to the servo motor of each operation axis is in an allowed range.

Figure 3:
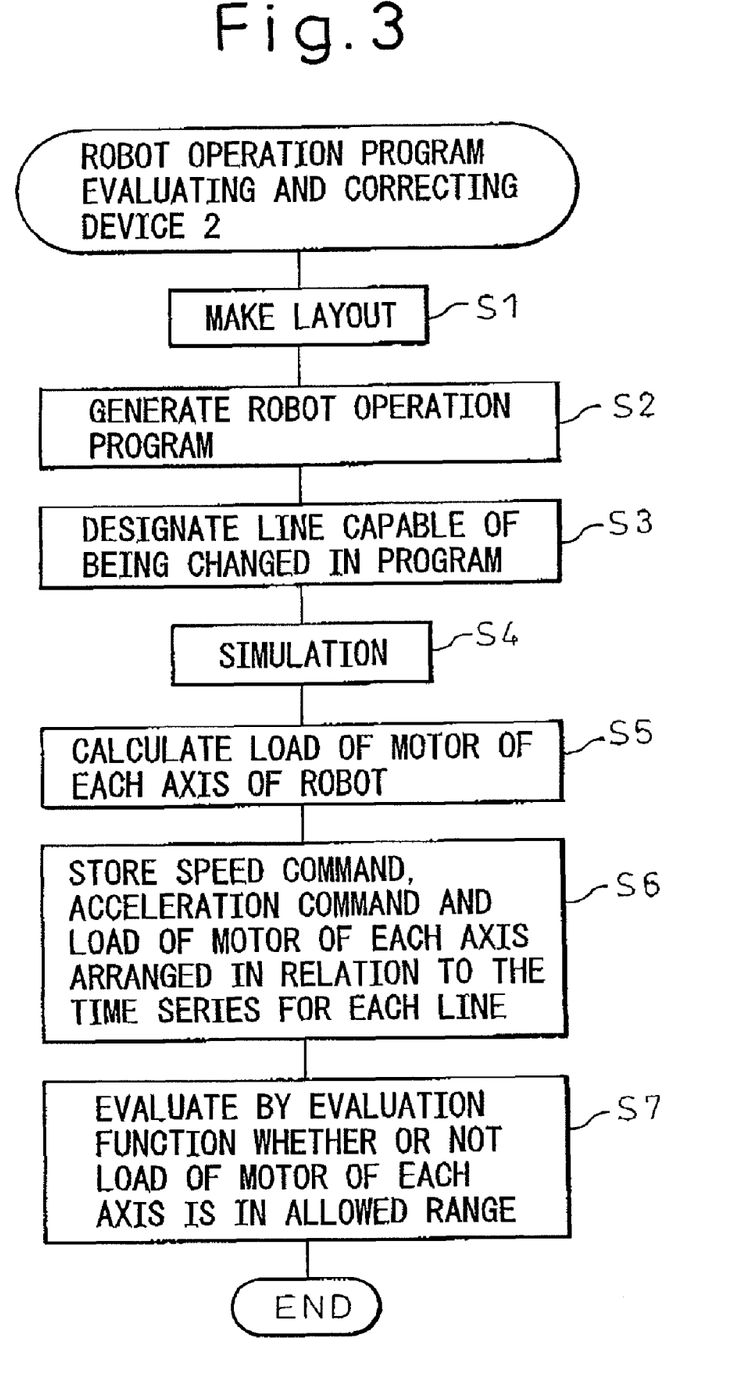
FIG. 3 is a flow chart showing a flow of the correcting method conducted by the robot operation program evaluating and correcting device shown in FIG. 2.

FIG. 3 is a flow chart showing a flow of the correcting method conducted by the robot operation program evaluating and correcting device 2 shown in FIG. 2. In step S1 shown in FIG. 3, a layout, in which image data of the robot 4, the workpiece and the peripheral device is three-dimensionally arranged, is made on an image plane of the output device. Concerning the image data of the positions and postures of the robot 4, the workpiece and the peripheral device, figure information and arrangement information are read in being sent from a CAD device.

In step S2, on the image plane of the output device 9, an operation program is made in relation to the robot 4, the workpiece and the peripheral device. In step S3, a condition of correcting the program is set, which corresponds to the designation section 11 of the robot operation program evaluating and correcting device 2. Specifically, the designation is conducted as follows. An operating portion of the robot 4 is designated, an allowed value of the load given to the servo motor is designated, an execution line of the program to be displayed on the image plane is designated, a speed command or an acceleration command, which is an object to be corrected, is designated, a correction data δ changed for each simulation is designated, and an initial value of the cycle time is designated.

In step S4, an operation program is executed by the simulation section 12 so as to conduct a simulation of the robot operation. Then, a present position of each operating axis for unit time is recorded together with the lapse of time, which corresponds to the simulation section 12 of the robot operation program evaluating and correcting device 2. In step S5, from a relation between the lapse of time and the position of each operating axis of the robot 4 obtained as a result of the simulation, a load torque of the servo motor is calculated by the following expression, which corresponds to the load calculation section 13 of the robot operation program evaluating and correcting device 2.

(Load torque)=(Newton·Euler's torque)+(Frictional force)+(Rotor inertia drive force)

In step S6, the speed command, the acceleration command and the load of each operating axis are stored in relation to the time series for each line, which corresponds to the storage section 14 of the robot operation program evaluating and correcting device 2. In step S7, it is evaluated by a well known evaluation function for each line of the operation program whether or not a load given to each operating axis is not more than an allowed value. At the same time, it is recorded whether or not the load given to each operating axis is in the allowed range for each line when the simulation is executed for the first time. In this case, the evaluation function is a function weighted as an evaluation criteria used for evaluating a load given to the servo motor or for optimizing a relative positional relation of the robot 4, the work and the peripheral device. Concerning this matter, refer to the official gazette of JP-A-2005-22062.

Figure 4:
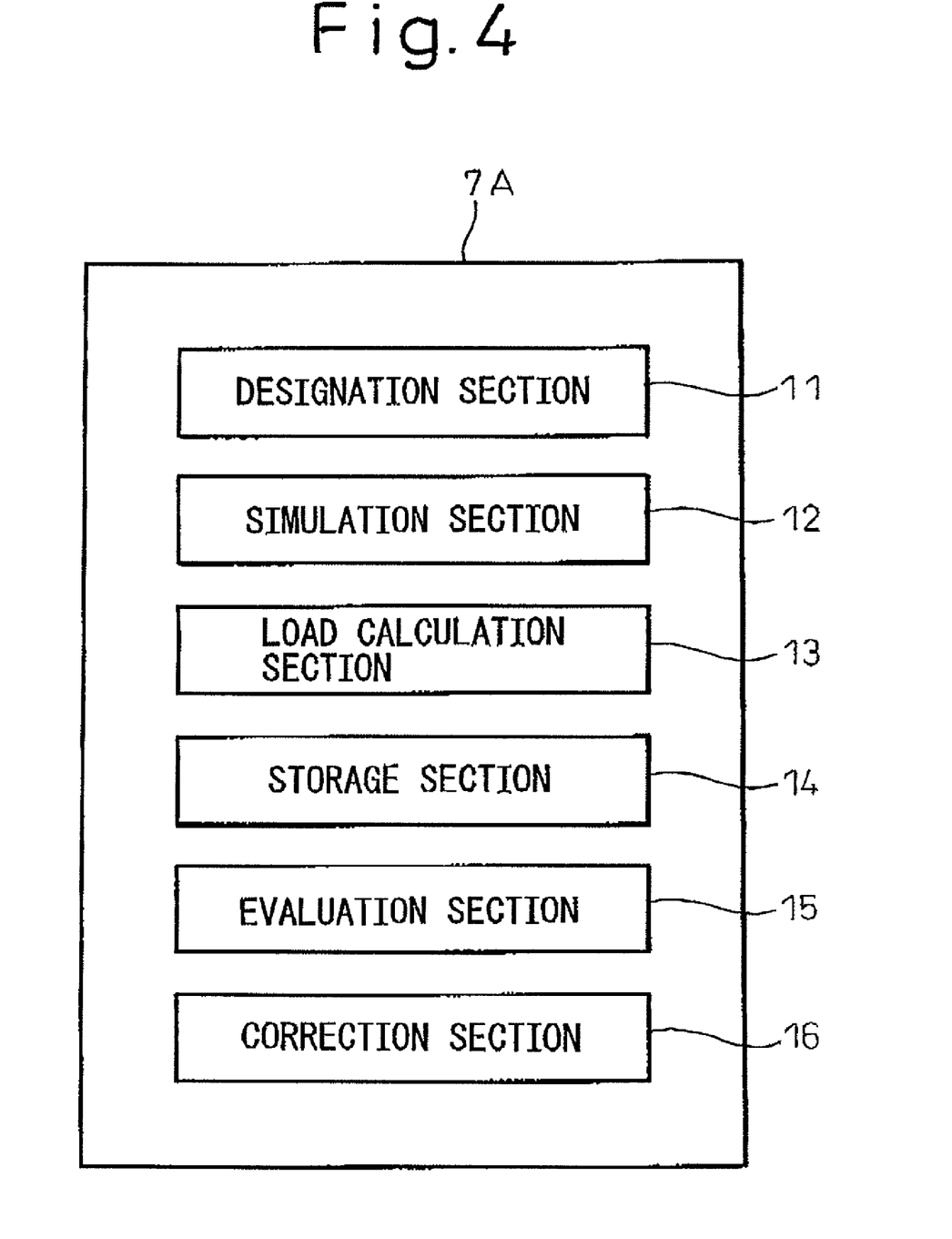
FIG. 4 is a block diagram showing the second embodiment of the robot operation program evaluating and correcting device.

FIG. 4 is a block diagram showing the second embodiment of the robot operation program evaluating and correcting device 2. Compared with the first embodiment, the robot operation program evaluating and correcting device of this embodiment (designated as 7A in FIG. 4) is added with a correcting section 16.

Figure 5:
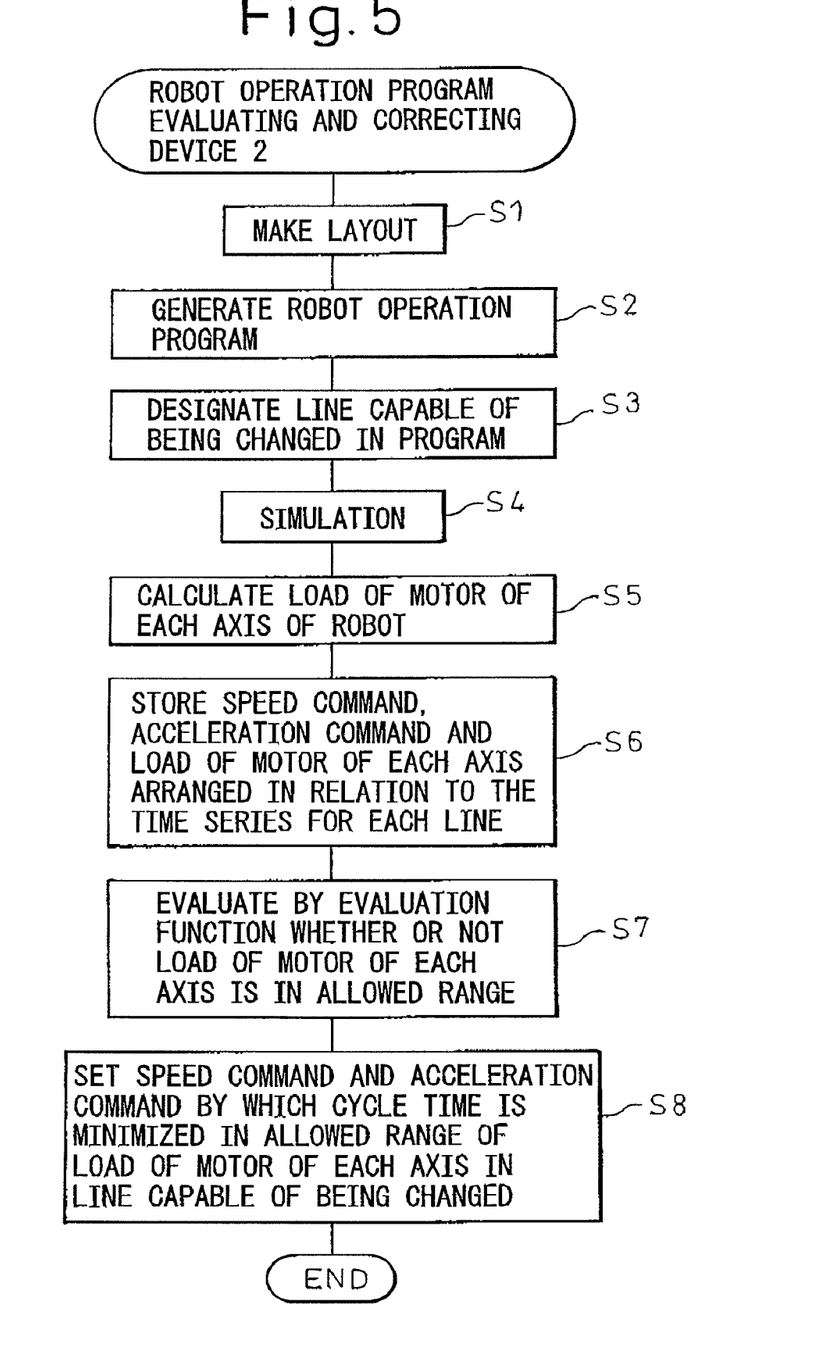
FIG. 5 is a flow chart showing a flow of the correcting method conducted by the robot operation program evaluating and correcting device shown in FIG. 4.

FIG. 5 is a flow chart showing a flow of the correcting method conducted by the robot operation program evaluating and correcting device 2 shown in FIG. 4.

This flow chart is composed in such a manner that the flow chart shown in FIG. 3 is added with a step S8. In step S8, operation is conducted as follows. In the case where it is evaluated in step S7 that a load of each operating axis is in an allowed range, a speed command, a acceleration command and executing time for each line and an entire cycle time are calculated. When the entire cycle time is shorter than the cycle time which has already been recorded, it is recorded. The correction data δ is added to the speed command and the acceleration command of an objective program line, and the simulation is repeated. In the case where it is evaluated that the load of each operating axis is not in the allowed range, a correction data δ is subtracted from the speed command and the acceleration command of the objective program line. In the case where it is not in the allowed range at the time of executing first, the correction data δ is subtracted from the speed command and the acceleration command of the objective program line until it is in the allowed range of the duty ratio. In the case where it is in the allowed range at the time of executing first, the correction data δ is added to the speed command and the acceleration command of the objective program line until it exceeds the allowed range of the duty ratio or until it reaches an upper limit of the speed command and the acceleration command.

When an evaluation is conducted for each line and it is executed for the first time, in the case where the load is not in the allowed range, at the point of time when the load enters the allowed range of the duty ratio, a change in the line is completed. If it is not so, the simulation of step S4 is conducted and the evaluation processing is repeated. In the case where the load is in the allowed range at the time of executing for the first time, when the load exceeds the allowed range of the duty ratio or when the load reaches the upper limit of the speed command and the acceleration command, the change in the line is completed. If the load is not so, the simulation of step S4 is conducted and the evaluation processing is repeated. This work is repeated until processing is completed with respect to all lines of the program.

Due to the foregoing, according to the first embodiment, the load given to the servo motor can be evaluated off-line, and whether or not the operation program is good can be evaluated according to this evaluation. Therefore, compared with a case in which the load is evaluated at the work-site, the operation program can be corrected in a short period of time and the set-up time of setting up the robot at the work-site can be reduced. Further, according to the second embodiment, compared with a case in which the speed command and the acceleration command are corrected at the work-site so that the cycle time can be minimized, the operation program can be corrected in a short period of time. Therefore, the set-up time of setting up the robot 4 at the work-site can be greatly reduced. In the case where many types of products are produced with the same robots 4, it is possible to save much time and labor for correcting the operation program.

Figure 6:
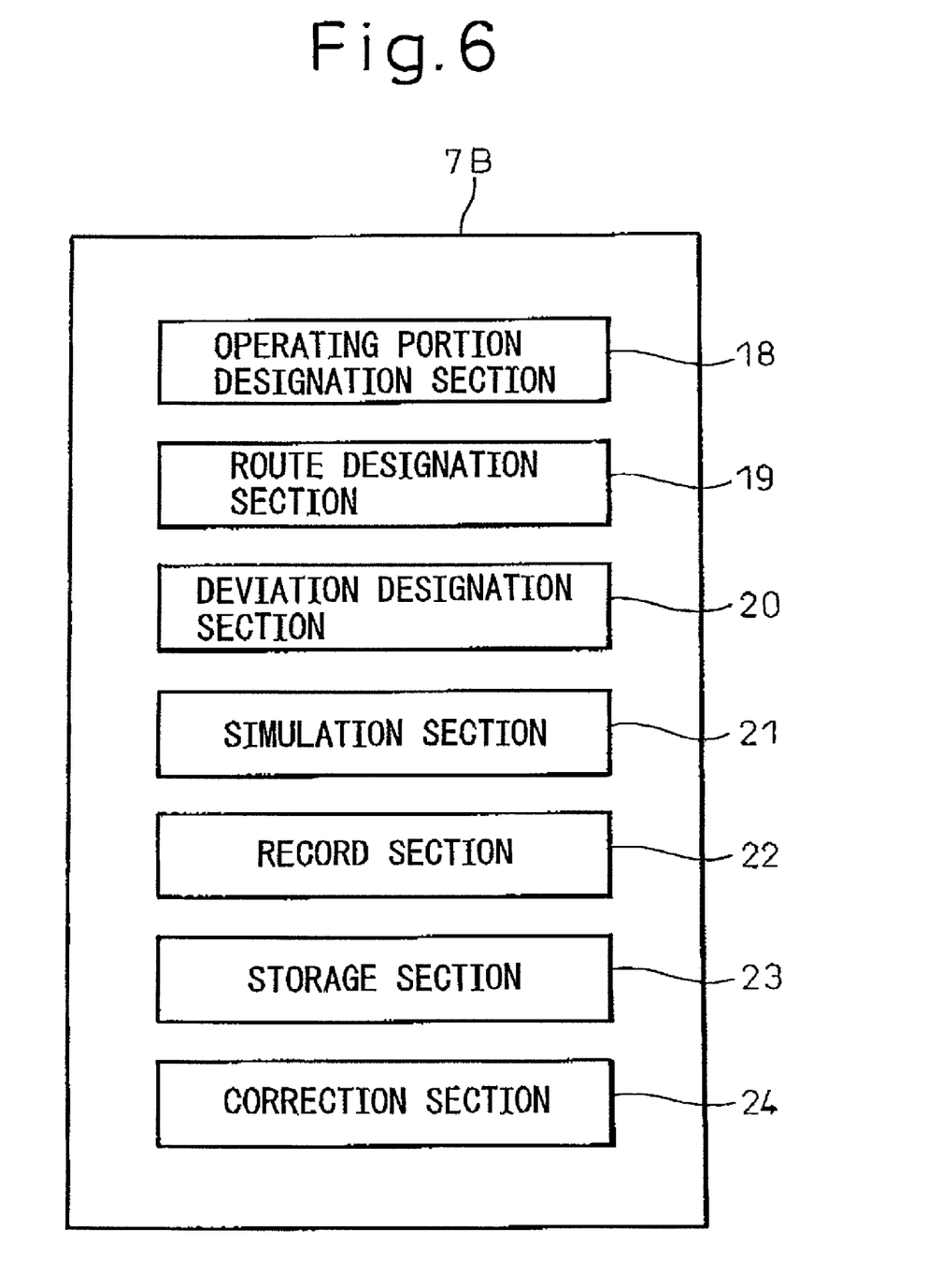
FIG. 6 is a block diagram showing the third embodiment of the robot operation program evaluating and correcting device.

Next, referring to FIG. 6, the third embodiment of the robot operation program evaluating and correcting device will be explained below. Except for the constitution of the computer 7B, the robot operation program evaluating and correcting device of this embodiment is the same as the first embodiment. Therefore, like reference numerals are used to indicate like parts in the first and the third embodiment.

The robot operation program evaluating and correcting device is capable of correcting a teaching point on the operation route of the operation program in a short period of time. The robot operation program evaluating and correcting device includes: an operating portion designation section 18 for designating an operating portion of each operating axis when an operation program, which has been read out, is displayed on an image plane; a route designation section 19 for storing a target operation route of an actual system and designating the target operation route; a deviation designation section 20 for designating a deviation between an arbitrary teaching point on a target operation route of the robot and a pseudo teaching point on a pseudo operation route made by a computer simulation corresponding to the target teaching point; a simulation section 21 for conducting a simulation of the operation program; a recording section 22 for recording the lapse of time and a position and a posture of the robot 4 according to the result of the simulation; a storage section 23 for calculating and storing a deviation between the target teaching point and the pseudo teaching point from the result of the simulation; and a correcting section 24 for correcting the pseudo teaching point in such a manner that whether or not the deviation is larger than an allowed value is evaluated by a well known evaluation function and in the case where the deviation is larger than the allowed value, the pseudo teaching point is changed by a predetermined changing distance so that the deviation can be reduced and the simulation is repeatedly executed until the deviation becomes smaller than the allowed value.

Figure 7:
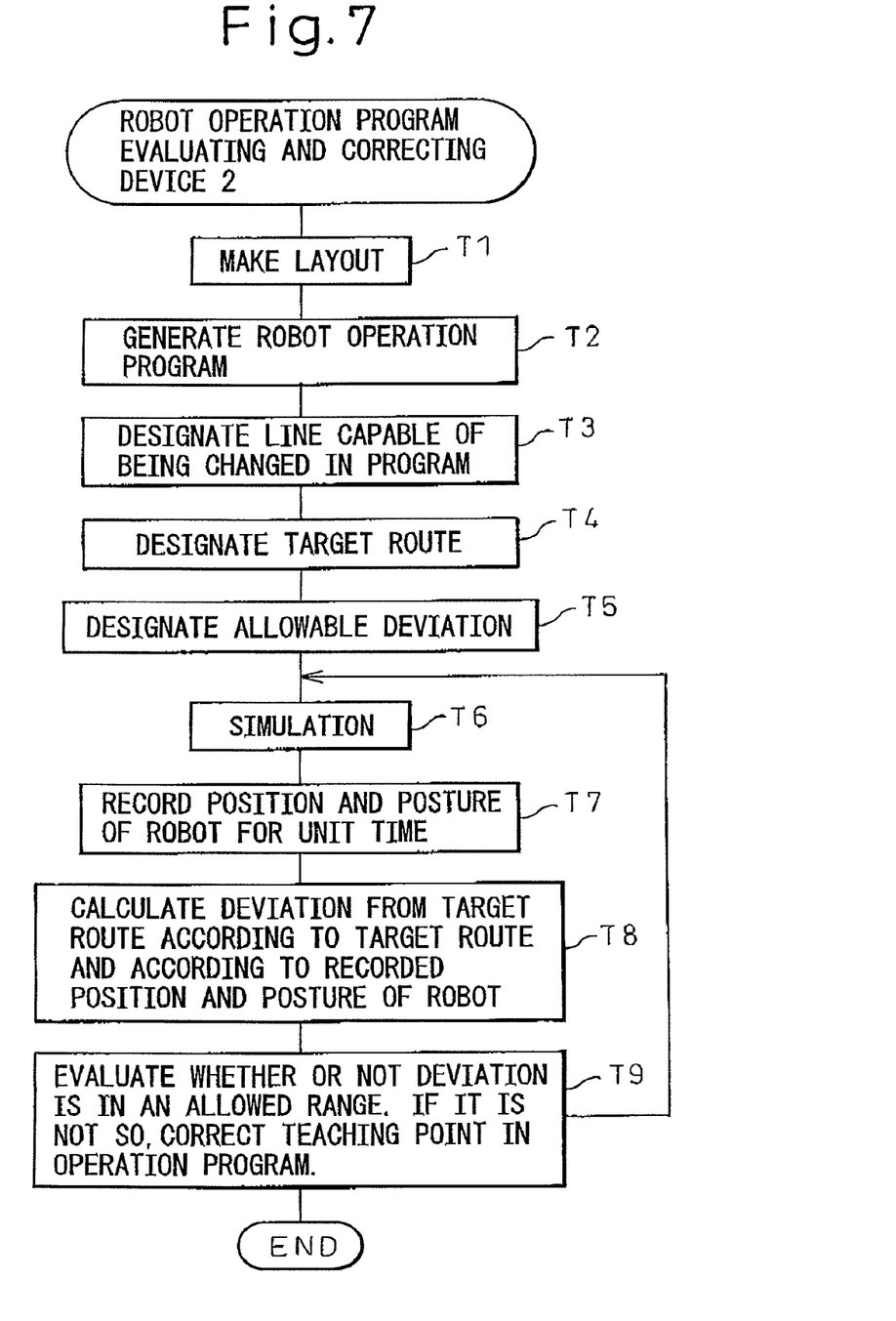
FIG. 7 is a flow chart showing a flow of the correcting method conducted by the robot operation program evaluating and correcting device shown in FIG. 6.

FIG. 7 is a flow chart showing a flow of the correcting method conducted by the robot operation program evaluating and correcting device. In step T1 shown in FIG. 7, a layout of three-dimensionally arranged image data of the robot 4, the workpiece and the peripheral device, on an image plane of the output device 9, is done. Concerning the image data of the positions and postures of the robot 4, the workpiece and the peripheral device, figure information and arrangement information are read in from a CAD device.

In step T2, on the image plane of the output device 9, an operation program corresponding to the robot 4, the workpiece and the peripheral device is made. In steps T3 to T5, a condition of correcting the program is designated. Specifically, the designation is conducted as follows. An operating portion of each operating axis of the robot 4 is designated, which corresponds to the operating portion designation section 18 of the robot operation program evaluating and correcting device. An execution line of the program to be displayed on the image plane is designated. A target operation route is designated as a three-dimensional curve, which corresponds to the route designation section 19 of the robot operation program evaluating and correcting device. A deviation from the target route is designated, which corresponds to the deviation designation section 20 of the robot operation program evaluating and correcting section.

In step T6, an operation program is executed by the simulation section 21 so as to simulate the robot operation. In step T7, a present position of each operation axis for unit time is recorded together with the lapse of time. Therefore, the teaching point can be referred from the execution line. This step corresponds to the record section 22 of the robot operation program evaluating and correcting device 7B.

In step T8, a target operation route is compared with a present value of the robot 4 for each unit time of the simulation result so as to calculate a deviation of the teaching point, which corresponds to the storage section 23 of the robot operation program evaluating and correcting device. Specifically, the target operation route is expressed as follows.

$$P_d(t_d) = A_d t_d^3 + B_d t_d^2 + C_d t_d + D_d$$

where $A_d$, $B_d$, $C_d$ and $D_d$ are constants.

Under the above condition, a three-dimensional curve is made from the simulation result and expressed as follows.

$$P_s(t_s) = A_s t_s^3 + B_s t_s^2 + C_s t_s + D_s$$

where $A_s$, $B_s$, $C_s$ and $D_s$ are constants.

The overall length $L_d$ of the target operation route is expressed as follows.

$$Ld = \int_{Td0}^{td1} |Pd(td)| dt$$

The overall length $L_s$ of the simulation result is expressed as follows.

$$Ls = \int_{Ts0}^{ts1} |Ps(ts)| dt$$

The positional calculation on the target route for calculating an objective deviation is expressed as follows.

$$ld = \int_{Td}^{td} |Pd(td)| dt$$

The positional calculation on the route as a result of the simulation is expressed as follows.

$$l_s = L_s \times l_d \div L_d$$

A value $t_s$ satisfying the above expressions is calculated and a deviation between $P_d(t_d)$ and $P_s(t_s)$ is found.

Value $t_s$ is changed from 0 to the final point and a deviation between $P_d(t_d)$ and $P_s(t_s)$ is found.

$$D(tds)=|Pd(t_d)-Ps(t_s)|$$

In step T9, it is evaluated whether or not the deviation is in the allowed range. In the case where the deviation is not in the allowed range, a teaching point in the operation program is corrected, which corresponds to the correcting section 24 in the robot operation program evaluating and correcting device.

That is, in the case of $$D(tds)=|Pd(t_d)-Ps(t_s)|>\delta,$$

the teaching point corresponding to $P_s(t_s)$ is moved by an amount $|Pd(t_d)-Ps(t_s)|$.

With respect to a large number of teaching points existing on the operation route of the operation program, processing of steps T6 to T9 is successively executed and the correction of the operation program is completed.

As described above, according to the third embodiment of the present invention, compared with a case in which a large number of teaching points are corrected at a work-site so that a target operation route and a pseudo operation route agree with each other, it is possible to correct a teaching point of the operation program in a short period of time. Therefore, it is possible to greatly reduce a set-up time of the robot 4 at the work-site. Accordingly, it is possible to easily construct a production system executed by a robot in a production site. Further, it is possible to flexibly cope with a change in the production system.

In this connection, it should be noted that the present invention is not limited to the above specific embodiment and that variations are possible. In this specification, the present invention is described being divided into the first, the second and the third embodiment. However, it is possible to merge these embodiments. For example, after the third embodiment has been executed and a deviation of the operation route has been corrected, when the first or the second embodiment is executed, a computer model and an actual system can be made to more properly agree with each other.

Referring to the preferred embodiments, the present invention has been explained above. However, changes may be made by those skilled in that art without departing from the scope of the claim described later.

The invention claimed is:

1. A method of evaluating and correcting a robot operation program for evaluating an appropriateness for the robot operation program and correcting the robot operation program, said method comprising:

designating a three-dimensional target operation route of the robot in a robot operation;

performing a simulation of the robot operation by a computer to determine a three-dimensional simulated operation route corresponding to the target operation route;

based on the overall length of the target operation route and the overall length of the simulated operation route, calculating a deviation between an arbitrary target teaching point on the target operation route of the robot and a corresponding simulated teaching point on the simulated operation route; and if the deviation exceeds a predetermined allowed value, correcting the simulated teaching point by repeatedly shifting the teaching point by a predetermined distance and executing the simulation until the deviation is decreased to be lower than the predetermined allowed value.

2. A device for evaluating an appropriateness of a robot operation program and correcting the robot operation program, said device comprising a computer including a simulation function for confirming a robot operation, the computer comprising:

a route designation section for designating a three-dimensional target operation route of the robot;

a simulation section for performing a simulation of the robot operation to determine a three-dimensional simulated operation route corresponding to the target operation route;

a storage section for calculating and storing, based on the overall length of the target operation route and the overall length of the simulated operation route, a deviation between an arbitrary target teaching point on the target operation route of the robot and a corresponding simulated teaching point on the simulated operation route; and a correction section for correcting the simulated teaching point, if the deviation exceeds a predetermined allowed value, by repeatedly shifting the teaching point by a predetermined distance and executing the simulation until the deviation is decreased to be lower than the predetermined allowed value.

* * * * *